Patented Oct. 23, 1928.

1,688,731

UNITED STATES PATENT OFFICE.

SYLVAN B. MERLEY, OF DOVER, NEW JERSEY, ASSIGNOR TO DOHERTY RESEARCH COMPANY, OF NEW YORK, N. Y., A CORPORATION OF DELAWARE.

DEHYDRATION OF ALCOHOLS.

No Drawing.  Application filed December 22, 1925. Serial No. 77,134.

The present invention is applicable to the dehydration of liquid organic compounds and more particularly to the dehydration of alcohols having four or more carbon atoms in their molecules.

It is well known at present how to make alcohols having three or more carbon atoms in their molecules from the olefine containing gases from petroleum stills or like sources, but the crude alcohols so obtained contain a high percentage of water. Such alcohols form constant boiling mixtures with water and may be rectified to obtain cuts composed principally of the such constant boiling mixtures of individual alcohols. The constant boiling mixture of the isopropyl, or alcohol containing three carbon atoms in its molecules, is sufficiently low in water so that, its other characteristics being taken into consideration, there is a commercial demand for the isopropyl alcohol cut without further dehydration. The butyl alcohol or alcohol containing four carbon atoms in its molecules and the alcohols heavier than butyl, however, need to be substantially anhydrous in order to meet commercial requirements. The commercial dehydration of such alcohols has presented practical difficulties, and it is one of the objects of the present invention to provide a method of dehydrating liquids capable of reducing the dissolved water in butyl or higher alcohols, or other liquid organic compounds to the required limits and which shall be cheap as well as rapid and convenient in operation.

A further difficulty met with in the art of producing commercial alcohols from olefine containing gases has come from the fact that the crude alcohols contain impurities producing off-odors. The commercial value of the alcohols depends in considerable measure upon their having a good odor, but the removal of the off-odor producing impurities has been not only technically difficult but has added considerably to the cost of the alcohols manufactured. It is a further object of the present invention to provide a method of dehydrating liquids capable of removing off-odor impurities of butyl and heavier alcohols simultaneously with the removal of the water, but applicable likewise to dehydration of other liquid organic compounds.

Briefly considered, the process according to the present invention consists in mixing with the higher alcohol or other liquid to be dehydrated, an alcohol or liquid which forms a constant boiling mixture with water within the limitations of the fractionating device to be used and then distilling the mixture with rectification to separate the higher boiling point alcohols. The liquid which is added to the liquid to be dehydrated must be an alcohol or other liquid having a boiling point lower than that of the liquid to be dehydrated, and the added liquid should also be soluble in the liquid to be dehydrated.

Assuming that the alcohol or liquid to be dehydrated is one capable of forming a constant boiling mixture with water, the mixture of the liquid to be dehydrated and the added liquid should contain at the time of the application to it of the process according to the present invention less water than required to form a constant boiling mixture with the added liquid. If the added liquid is substantially dry, it can, of course, carry off more water than if not. It is convenient to reduce the amount of water present in the liquid to be dehydrated by a preliminary dehydration by chemical or other means to that capable of forming a constant boiling mixture with 25% of the alcohol or liquid to be dehydrated. When the lower boiling point liquid is mixed with alcohol or other liquid to be dehydrated, and the mixture distilled the water is taken up by the added low boiling point liquid and the low boiling point liquid together with the water which it extracts from the high boiling point liquid is removed first in distillation, and by the time the distillation has proceeded to the point at which much of the originally hydrous liquid is vaporized, substantially all of the water and lower boiling point liquid has been removed from the still. It is possible, therefore, to recover substantially dehydrated higher boiling point liquid by a continued rectification of the mixture. Furthermore, when produced as above described according to the present invention, the off-odor producing impurities are very largely removed from the liquid being dehydrated simultaneously with the water. It has been found, moreover, that a class of liquids acting to remove water from other alcohols or liquids as above described cause an anomalous variation in the temperature during distillation. Such liquids are included among those mentioned above as forming a constant boiling mixture with water and also being soluble in and having a lower boiling point than the main constituent of liquid to be dehydrated. When certain of the substances just mentioned are added to liquid to be dehydrated in a still and containing heavy secondary alcohol or alcohols and water together with a small percentage of light low boiling water-insoluble hydrocarbons and/or other low boiling off-odor water-insoluble compounds and the temperature of the mixture raised to the distillation point, it will be found that the temperature within the still at the beginning of distillation is higher than the boiling point of the mixed liquid being dehydrated, this excess of temperature being maintained until practically all the water has been removed. When this phenomenon occurs, the removal of the off-odor impurities along with the water is remarkably efficient. An illustration of a substance producing the anomalous action just mentioned is a secondary butyl alcohol when used to dehydrate amyl alcohol or mixture of amyl and higher alcohols according to the process briefly described above.

For the purpose of further illustration, a process will be described in some detail by which secondary amyl and hexyl alcohols may be dehydrated and recovered from the mixture of alcohols obtained by the acid absorption and hydrolyzation of olefines contained in pressure still gases. The gases are absorbed in the sulfuric acid to obtain an alkyl sulfuric acid and the alkyl sulfuric acid is then hydrolyzed with water to obtain a mixture of alcohols. This mixture of alcohols is then distilled to recover various cuts including an isopropyl alcohol cut, a butyl alcohol cut, and a cut of alcohols higher than butyl alcohol. The butyl alcohol cut is then fractioned and the fraction is dehydrated by treatment with caustic or by distillation over caustic. The butts of the butyl alcohol fractional distillation is composed principally of amyl and the higher alcohols and a definite proportion of the butyl alcohol. This butyl alcohol is substantially dry and cannot be separated from the butts mixture by fractionation. The dry butyl alcohol in the butts is well adapted for dehydrating the higher alcohols such as amyl, hexyl and heptyl alcohols. Accordingly, the butts containing the butyl alcohol is added to a fraction of the higher alcohols composed principally of amyl and higher alcohols, in sufficient quantity to provide enough butyl alcohol to take up the amount of water which may be present in the mixture of the higher alcohols. This mixture of higher alcohols and butyl alcohol butts is then distilled by rectification to recover the various alcohols. In this rectification the amyl, hexyl and heptyl alcohol are separated as substantially dehydrated alcohols.

During the process of absorbing olefines by acid and the various hydrolyzing and distilling steps certain compounds are formed and absorbed in the alcohols and these compounds spoil the odor of the alcohol. It is very desirable therefore that these compounds should be removed from the alcohols during the fractionation or rectification. It has been found that when dry butyl alcohol is added to a mixture of higher alcohols containing off-odor compounds and then the mixture of dry butyl alcohol and higher alcohols distilled with fractionation or rectification that the butyl alcohol tends to separate the off-odor compounds, as well as the water from the higher alcohols and thereby permits the recovery of the higher alcohols which have a good odor and are substantially free of water.

It will be obvious that dry secondary butyl alcohol may be used for dehydrating higher alcohols in the place of the butyl alcohol distillation butts. However, these butts contain higher alcohols as well as the dehydrated butyl alcohol and therefore the use of the butts is very advantageous in an alcohol rectifying process in that it permits the recovery of the higher alcohols in the butts and also provides the use of an unrefined product for accomplishing a very advantageous result.

A second example or illustration of the process according to the present invention is the dehydration of the butyl alcohol cut above mentioned by isopropyl alcohol. Assuming that the butyl alcohol cut above mentioned has been dehydrated by caustic soda or analogus means so that it contains only approximately enough water that 25% of the butyl-water mixture will distil by Engler distillation below 95° C., the butyl alcohol is mixed with a relatively small percentage of substantially dry isopropyl alcohol and the mixture thereupon is distilled with rectification. The isopropyl alcohol for admixture with the butyl cut as just mentioned may be conveniently dehydrated to the desired point for use in the present invention by agitation in contact with caustic soda. The quantity of dry isopropyl alcohol required in dehydrating and deodorizing 1800 gallons of secondary butyl alcohol as just described is about 350 gals.

The alcohols formed from cracked petroleum gases are secondary alcohols and therefore the dehydrated butyl alcohol used for drying the higher alcohols is a secondary butyl alcohol. The invention however is not limited to the use of the secondary alcohols for drying higher boiling point secondary alcohols, but a lower boiling point liquid, either primary, secondary or tertiary alcohol or other liquid may be used for dehydrating a higher point primary, secondary, or tertiary alcohol or other liquid; it being important, however, that the lower boiling point liquid or alcohol which is used for dehydrating the higher boiling point liquid or alcohol should form a constant boiling point mixture with water and preferably this constant boiling point mixture should not be less than 15% of water. Furthermore, the low boiling point alcohol or liquid used for dehydrating the higher boiling point alcohol should be substantially dry or should contain considerably less water than is contained in its constant boiling point mixture with water. It has been found that alcohol such as methyl, ethyl, propyl, isopropyl, butyl and secondary butyl may be effectively used in dehydrating higher alcohols such as amyl, hexyl or heptyl alcohols or a mixture of these higher alcohols. Secondary butyl alcohol has been found to be very advantageous in dehydrating the higher secondary alcohols in that the secondary butyl alcohol forms a constant boiling point mixture with water which consists of substantially 22 parts by volume of water to 78 parts by volume of secondary butyl alcohol. This fact permits the use of a comparatively small amount of butyl alcohol to take up a very large proportion of water from the higher boiling point mixture. Furthermore, water is quite readily soluble in the butyl alcohol whereas water is soluble with difficulty in secondary amyl, hexyl and heptyl alcohol.

The preferred form of the invention having been thus described what is claimed as new is:

1. The method of dehydrating heavy secondary alcohol liquids containing small quantities of low boiling off-odor compounds comprising rectifying the liquid to be dehydrated with a substantially dry alcohol of lower boiling point than that of the alcohol to be dehydrated and forming a constant boiling point mixture with water and causing the temperature of initial distillation of the mixture to be higher than the boiling point of the liquid to be dehydrated.

2. The method of dehydrating heavy secondary alcohol liquids containing small quantities of low boiling off-odor compounds and simultaneously removing impurities insoluble in water comprising rectifying the liquid to be dehydrated in admixture with a substantially dry alcohol of lower boiling point than that of the alcohol to be dehydrated and forming a constant boiling point mixture with water and causing the temperature of initial distillation of the mixture to be higher than the boiling point of the liquid to be dehydrated.

3. A method of dehydrating alcohols having at least five carbon atoms in their molecules comprising distilling such alcohol with dehydrated secondary butyl alcohol.

4. A method of dehydrating secondary alcohols having at least five carbon atoms in their molecules comprising distilling such alcohol with the still butts formed in a rectifying distillation of dehydrated secondary butyl alcohol.

5. A method of dehydrating and improving the odor of secondary alcohols having at least five carbon atoms in their molecules, comprising distilling such alcohols with secondary butyl alcohol.

In testimony whereof I affix my signature
SYLVAN R. MERLEY.